US000001237H

United States Statutory Invention Registration [19]

[11] Reg. Number: H1237

[43] Published: Oct. 5, 1993

Lowther et al.

[54] METHOD FOR STABILIZING AN AREA OF THE EARTH'S SURFACE

[76] Inventors: Frank E. Lowther, 2928 Clear Springs, Plano, Tex. 75075; Douglas J. Ruckel, 11611 Snowline Cir., Anchorage, Ak. 99516

[21] Appl. No.: 970,217

[22] Filed: Nov. 2, 1992

[51] Int. Cl.[5] ..... F25D 23/12; F28D 1/00

[52] U.S. Cl. ..... 165/45; 62/260

[58] Field of Search ..... 165/45; 62/260; 405/130; 166/901

[56] References Cited

U.S. PATENT DOCUMENTS

| | | | |
|---|---|---|---|
| 3,183,675 | 5/1965 | Schroeder | 62/260 |
| 4,080,797 | 3/1978 | Thompson | 62/260 |
| 4,860,544 | 8/1989 | Krieg et al. | 405/130 |

*Primary Examiner*—David H. Brown
*Attorney, Agent, or Firm*—F. Lindsey Scott

[57] ABSTRACT

A method for producing a stabilized area by positioning a plurality of heat transfer tubes on or below the surface of the stabilized area and flowing a coolant through the tubes to maintain a stabilized area in a frozen condition. Water may also be frozen over the stabilized area.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR STABILIZING AN AREA OF THE EARTH'S SURFACE

BACKGROUND OF THE INVENTION

1. Field of the Invention

This invention relates to a method for stabilizing an area of the earth's surface by positioning heat transfer tubes on the surface or beneath the surface of the stabilized area to freeze the area or to freeze and produce an ice covering over the area.

2. Background

In many areas of the world such as zones covered by permafrost or zones which are boggy or otherwise unconsolidated at the surface, a continuing problem in the conduct of various industrial operations is the lack of a stable surface upon which the operations can be conducted. Such operations as drilling oil wells, either to explore for or produce oil from subterranean formations, the construction of permanent facilities or the like all require a relatively stabilized area of the earth. Heretofore, stabilized areas have been created by the use of pilings, gravel pads and the like, to produce an area which is relatively stable and suitable for the conduct of such operations. The use of such techniques has been found to be reliable but it is relatively expensive, time-consuming and leaves the abandoned stabilized area as an unnatural change in the local environment when the operation is concluded.

Accordingly, a continuing search has been directed to the development of methods whereby stabilized areas can be created more economically and so that the stabilized areas are readily removed when the operation is concluded.

SUMMARY OF THE INVENTION

It has now been found that a stabilized area can be produced on the surface of the earth by consolidating and strengthening the stabilized area by positioning a plurality of heat transfer tubes beneath the surface of the stabilized area and flowing a coolant through the tubes to maintain the stabilized area in a frozen condition.

The tubes can also be positioned at least partially beneath the surface of the stabilized area and thereafter a water-restraining barrier can be positioned to enclose the area and subsequently filled with water which is frozen by flowing coolant through the tubes to freeze the water and maintain the water and the stabilized area in a frozen condition.

The tubes can also be placed on the surface of the stabilized area when water is used as discussed above to form ice as the surface of the stabilized area.

DESCRIPTION OF PREFERRED EMBODIMENTS

In the description of the figures, the same numbers will be used throughout to refer to the same or similar components.

Figure 1:
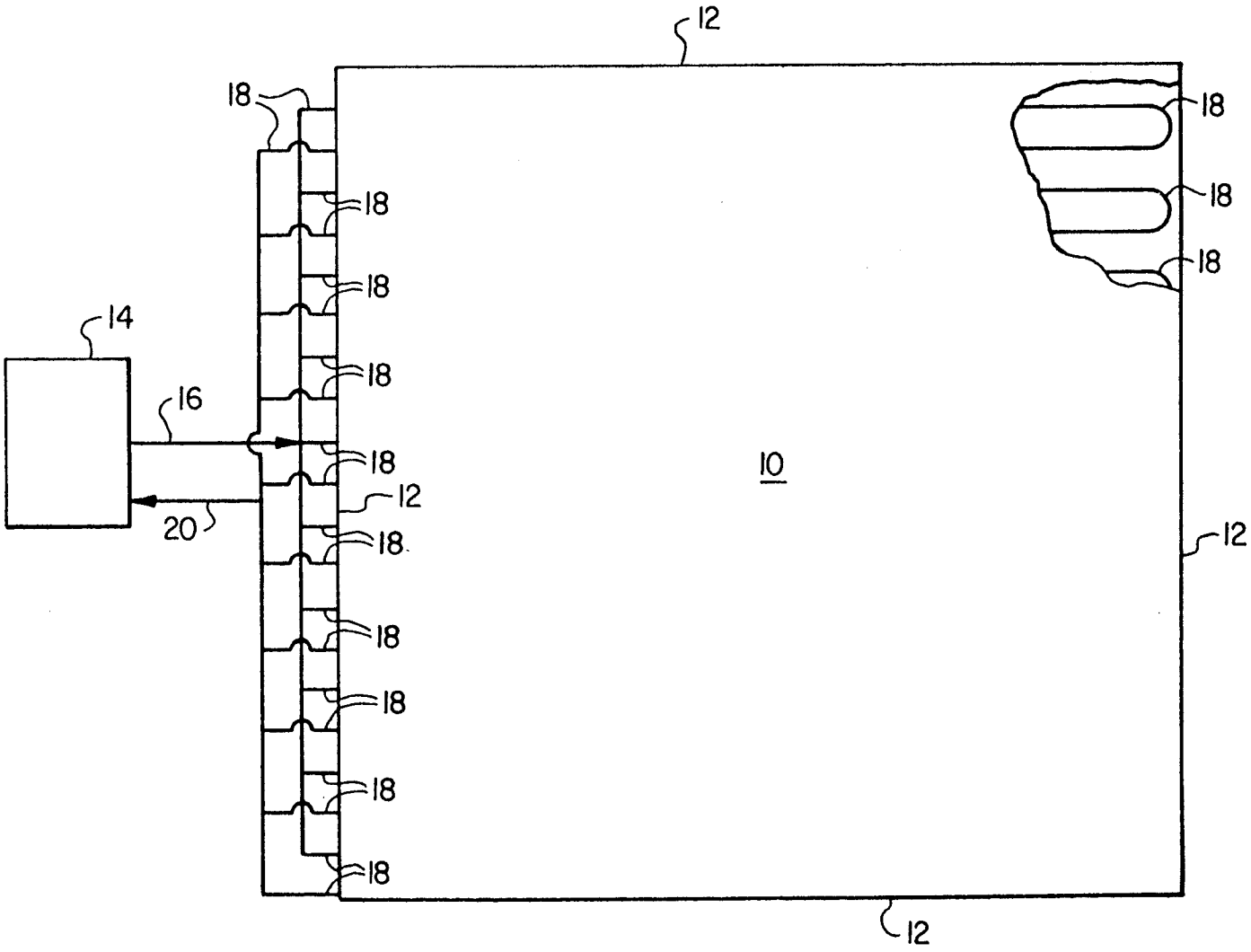
FIG. 1 is a top view of a stabilized area which is stabilized by the method of the present invention.

In FIG. 1, a stabilized area 10 is shown. Stabilized area 10 is bounded by sides 12 and has been stabilized by positioning a plurality of heat transfer tubes 18 beneath the surface of area 10. Heat transfer tubes 18 are fluidly connected to a coolant line 16 which supplies coolant from a refrigeration unit 14. The coolant returns to refrigeration unit 14 through a coolant return line 20. A portion of the heat transfer tubes beneath area 12 are shown in broken out section. In this embodiment of the invention, the heat transfer tubes are simply placed beneath the surface of the area of interest and the area of interest is then frozen or, if already frozen, then maintained in a frozen condition, to consolidate and stabilize area 10. This may be sufficient in areas of permafrost or boggy or otherwise naturally wet areas since the frozen surface can be used for the conduct of operations with no further treatment of the surface.

The use of ice surfaces in warm environments is well known in the art as discussed, for instance, in "Ice Rink Buying and Specifying Guide and Checklist" published in 1984 by Holmsten Ice Rinks, Inc. Such ice rinks are routinely constructed and operated in shopping centers, sports arenas and the like where the ambient temperature is well above the freezing point of water. Such techniques are well known to those skilled in the art and are readily adaptable to the production of stabilized areas of the present invention.

Figure 2:
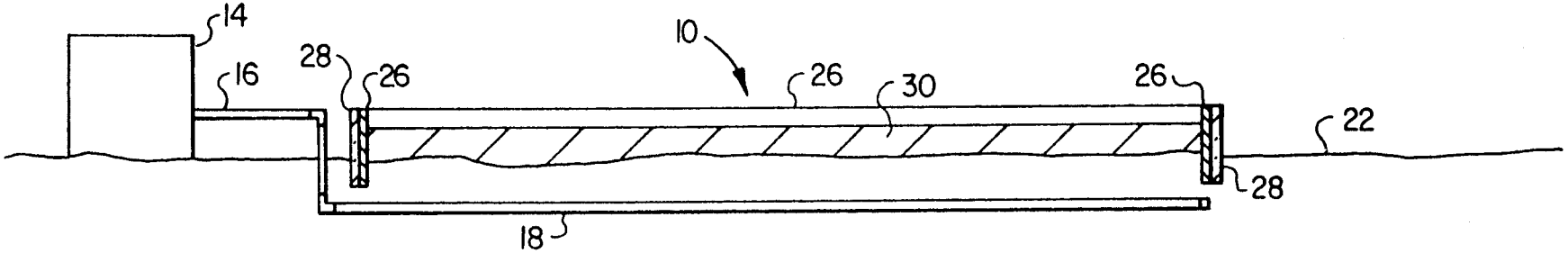
FIG. 2 is a side view of a further embodiment of the present invention.

In FIG. 2, a cross-sectional view of an alternate embodiment of the present invention is shown. In this embodiment, heat transfer tubes 18 are positioned beneath the surface of the stabilized area 10. A restraining barrier 26 which may be made of any suitable water-retaining wall such as a polyethylene, aluminum, steel, a mound of earth or other suitable material is positioned about area 10. Water is then flowed into area 10 with cooling supplied by heat transfer tubes 18 and the water is frozen to provide a stabilized work surface. The area beneath the ice is also maintained in a frozen condition to a depth dictated by the heat transfer away from heat transfer tubes 18 in a downward direction. It will be appreciated that, while not shown, a plurality of heat transfer tubes 18 could be used at varying depths to ensure the desired stability to a greater depth in warmer regions. In permafrost areas, there will be no need for such additional pipes since the ground beneath tubes 18 is frozen continuously. Ice 30, when formed over area 10, constitutes a desirable work surface. Ramps or the like may be constructed from surface 20 to permit ready access to vehicles to area 10. Desirably, a layer of insulation 28 is provided between a surface 22 and water barrier 26.

Figure 3:
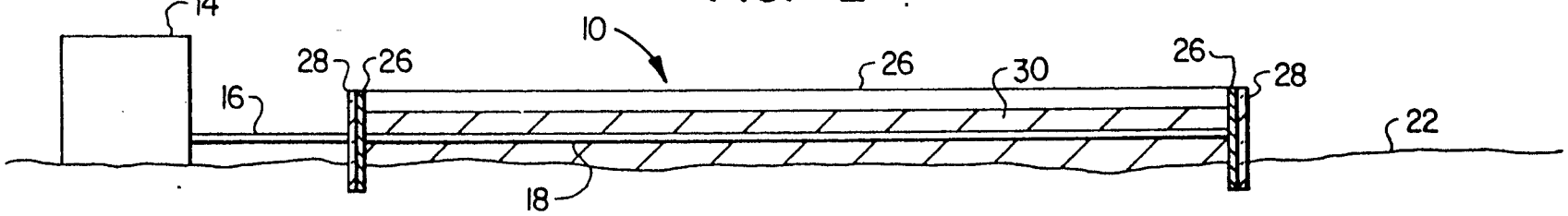
FIG. 3 is a further embodiment of the method of the present invention.

In FIG. 3, an alternate embodiment is shown wherein the heat transfer tubes are above the surface in area 10. The heat transfer tubes are embedded in the ice as shown when the water is frozen.

Figure 4:
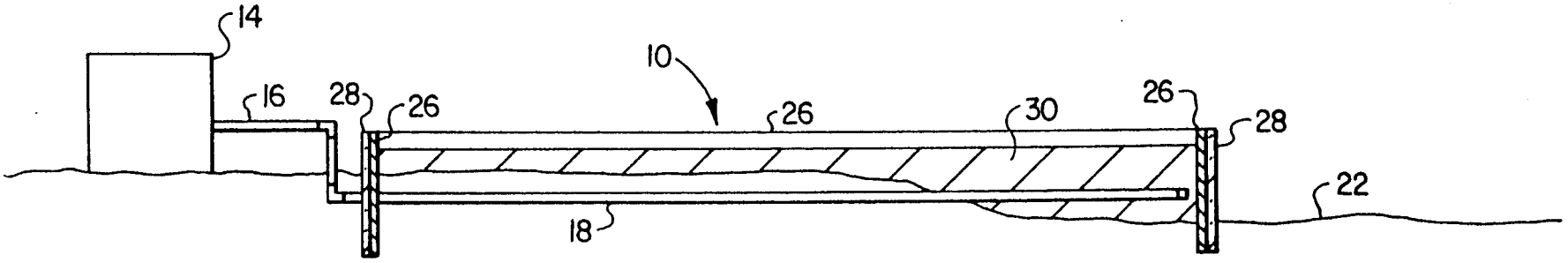
FIG. 4 represents a further embodiment of the present invention.

In FIG. 4, a still further variation is shown wherein heat transfer tubes 18 are partially beneath the surface below area 10 and partially in the ice. This embodiment will be effective where uneven terrain is encountered.

Other materials may be placed above the ice, if necessary. For instance, sawdust or other insulating materials may be dispersed over the surface of ice 30 to inhibit thawing during warmer periods. Similarly, sand or other materials useful to increase the friction on ice 30 may be used.

Refrigeration units suitable for use for this purpose are those which are suitable for refrigeration in commercial ice rinks and the like currently in use. As a result of the simplicity of the design, the cost of constructing stabilized areas using the method of the present invention is greatly reduced and, when the stabilized area is no longer needed, the tubes, refrigeration unit and retaining walls can be readily removed and the ice can be allowed to melt or, if rapid melting is desired, a hot fluid may be pumped through the tubes to speed the melting. The stabilized area can thus be returned to its native state in a very short period of time.

Coolants used in the present invention are those known to the art for such purposes. Such coolants are typically brines such as water and calcium chloride or other inorganic salts or water and ethylene glycol. In more modern systems, chlorinated hydrocarbons such as FREON 22 and other chlorinated hydrocarbons may be used. Similarly, coolants such as ammonia or other materials may be used. The choice of the particular coolant is considered to be within the skill of those in the art.

In the event that operations are to be conducted which result in drilling or otherwise penetrating area 10, tubes 18 are readily arranged to provide for an area for such penetration which includes no heat transfer tubes. The tubes adjacent the area can be readily formed to permit the penetration of area 10. Such variations are considered to be obvious to those skilled in the art.

In a further embodiment of the invention, temporary roadways may be formed by positioning tubes beneath an area to be used as a roadway and then freezing or maintaining the area in a frozen condition when it is desired to use the roadway.

Having thus described the invention by reference to its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of the preferred embodiments.

Having thus described the invention, we claim:

1. A method for producing a stabilized area on the surface of the earth by consolidating and strengthening said stabilized area by:

(a) positioning a plurality of heat transfer tubes beneath the surface of said stabilized area; and (b) flowing a coolant through said tubes to maintain said stabilized area in a frozen condition.

2. The method of claim 1 wherein said stabilized area is in a permafrost zone.

3. The method of claim 1 wherein said tubes are configured to permit well drilling and oil production operations through said stabilized area.

4. A method for producing a stabilized area on the surface of the earth by consolidating and strengthening said stabilized area by:

(a) positioning a plurality of heat transfer tubes at least partially beneath the surface of said stabilized area;

(b) positioning a water restraining barrier to enclose said stabilized area;

(c) covering at least a major portion of said stabilized area with water; and (d) flowing coolant through said tubes to freeze said water and to maintain said water and said stabilized area in a frozen condition.

5. The method of claim 4 wherein said stabilized area is in a permafrost zone.

6. The method of claim 4 wherein said tubes are configured to permit well drilling and oil production operations through said stabilized area.

7. A method for producing a stabilized area on the surface of the earth by consolidating and strengthening said area by:

(a) positioning a plurality of heat transfer tubes on the surface of said stabilized area;

(b) positioning a water restraining barrier to enclose said stabilized area;

(c) covering at least a major portion of said stabilized area with water; and (d) flowing coolant through said tubes to freeze said water and to maintain said water and said stabilized area in a frozen condition.

8. The method of claim 7 wherein said stabilized area is in a permafrost zone.

9. The method of claim 7 wherein said tubes are configured to permit well drilling and oil production operations through said stabilized area.

* * * * *